United States Patent [19]

Iwamoto

[11] Patent Number: 5,751,259
[45] Date of Patent: May 12, 1998

[54] WIDE VIEW ANGLE DISPLAY APPARATUS

[75] Inventor: Kazuyo Iwamoto, Tsukuba, Japan

[73] Assignee: Agency of Industrial Science & Technology, Ministry of International Trade & Industry

[21] Appl. No.: 410,757

[22] Filed: Mar. 27, 1995

[30] Foreign Application Priority Data

Apr. 13, 1994 [JP] Japan ................... 6-100526

[51] Int. Cl.$^6$ ................................. G09G 5/00
[52] U.S. Cl. ............... 345/8; 345/1; 345/7; 345/9; 359/13; 359/630
[58] Field of Search ................ 345/7, 8, 9, 1; 359/13, 630

[56] References Cited

U.S. PATENT DOCUMENTS

| | | | |
|---|---|---|---|
| 4,722,601 | 2/1988 | McFarlane | 345/8 |
| 5,093,567 | 3/1992 | Staveley | 345/8 |
| 5,276,471 | 1/1994 | Yamauchi et al. | 345/8 |
| 5,322,441 | 6/1994 | Lewis et al. | 345/8 |
| 5,467,104 | 11/1995 | Furness, III et al. | 345/8 |
| 5,635,947 | 6/1997 | Iwamoto | 345/7 |

*Primary Examiner*—Richard Hjerpe
*Assistant Examiner*—Kent Chang

[57] ABSTRACT

A wide view angle display apparatus includes a pair of display devices each including a display for displaying an image, a high resolution display for superimposing a high resolution image at a center portion of the displayed image and eye movement detection means for ascertaining the view point of the user's eye, a support/drive means associated with each display device for supporting the display device and moving it in accordance with a signal from the eye movement detection means to keep the center of the displayed image coincident with the view point, a video signal generating means associated with each display devices for sending a view point video signal to the display based on a signal from the eye movement detection means, and a high resolution video signal generating means associated with each display device for sending a high resolution video signal to the high resolution display.

4 Claims, 3 Drawing Sheets

WIDE VIEW ANGLE DISPLAY APPARATUS

BACKGROUND OF THE INVENTION

1. Field of the Invention

This invention relates to a wide view angle display apparatus for displaying visual images giving an impression of virtual reality or visual images for remote robot control.

2. Description of the Prior Art

As image displays for displaying realistic visual images (virtual reality) and visual images for remote robot control, there have been developed head mounted displays (HMDs) designed to be worn on the head like a helmet. When a user puts on an HMD, liquid crystal displays are positioned in front of the eyes for displaying an image that changes with the movement of the user's head. However, these image displays merely maintain a fixed positional relationship between the head and the display and do not enable the image to respond to movement of the user's view points (the positions on an object toward which the central axes of the eyeballs are directed). When the user shifts his or her view points, therefore, the edge of the displayed image comes into view. This gives the impression of looking through a window and degrades the realism of the experience.

Moreover, the structure of the prior art HMDs makes it difficult to use large liquid crystal displays. If only the pictures displayed on the liquid crystal displays are enlarged for overcoming this problem, however, the realism is degraded owing to the resulting decrease in resolution.

The main object of this invention is to provide a wide view angle display apparatus wherein the display is mechanically moved in response to shifts in the user's view points during display of highly realistic images or images for robot remote control, so that the displayed image moves together with user eye movement to prevent the edge of the image from coming into view and thereby providing a wide view angle which enhances realism.

Another object of the invention is to provide a wide view angle display apparatus which in addition to providing a wide view angle also gives the impression of high overall image resolution owing to increased resolution only at the center portion of the field of vision.

SUMMARY OF THE INVENTION

For achieving the aforesaid object, the present invention provides a wide view angle display apparatus comprising a pair of display devices each including a display for displaying an image, a high resolution display for superimposing a high resolution image at a center portion of the displayed image and eye movement detection means for ascertaining a view point, a support/drive means associated with each display device for supporting the display device and moving it in accordance with a signal from the eye movement detection means to keep a center of the displayed image coincident with the view point, a video signal generating means associated with each display devices for sending a view point video signal to the display based on a signal from the eye movement detection means, and a high resolution video signal generating means associated with each display device for sending a high resolution video signal to the high resolution display.

When the user of the wide view angle display apparatus configured in the foregoing manner brings his or her head in front of the display devices, virtual reality images or images for remote robot control can be seen on the displays located in front of the eyes. The user's view points are detected by the eye movement detection means and the support/drive means are operated based on the outputs from the eye movement detection means for moving the display devices so as to align the centers of the displays with the view points. In addition, the video signal generating means controlled based on the outputs of the eye movement detection means sends the view point video signals to the displays. Since the edges of the displayed images therefore do not come into the user's field of vision, the user perceives a wide view angle and a markedly improved sense of reality.

Moreover, since the wide view angle display apparatus according to the invention is equipped with the high resolution displays for superimposing high resolution images on the aforesaid displays at the center portions aligned with view points, the reality of the images displayed within the wide view angle is even further enhanced.

The above and other features of the present invention will become apparent from the following description made with reference to the drawings.

DESCRIPTION OF THE PREFERRED EMBODIMENTS

Figure 1:
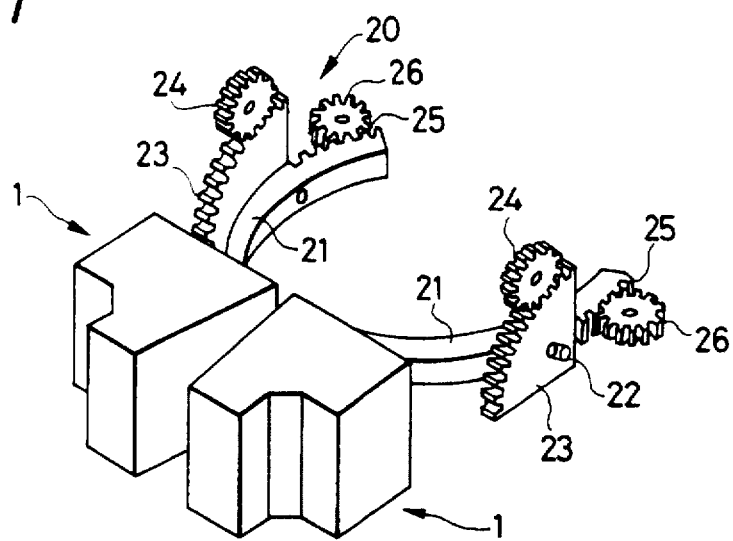
FIG. 1 is a perspective view showing the configuration of a wide view angle display apparatus which is an embodiment of the present invention.
Figure 2:
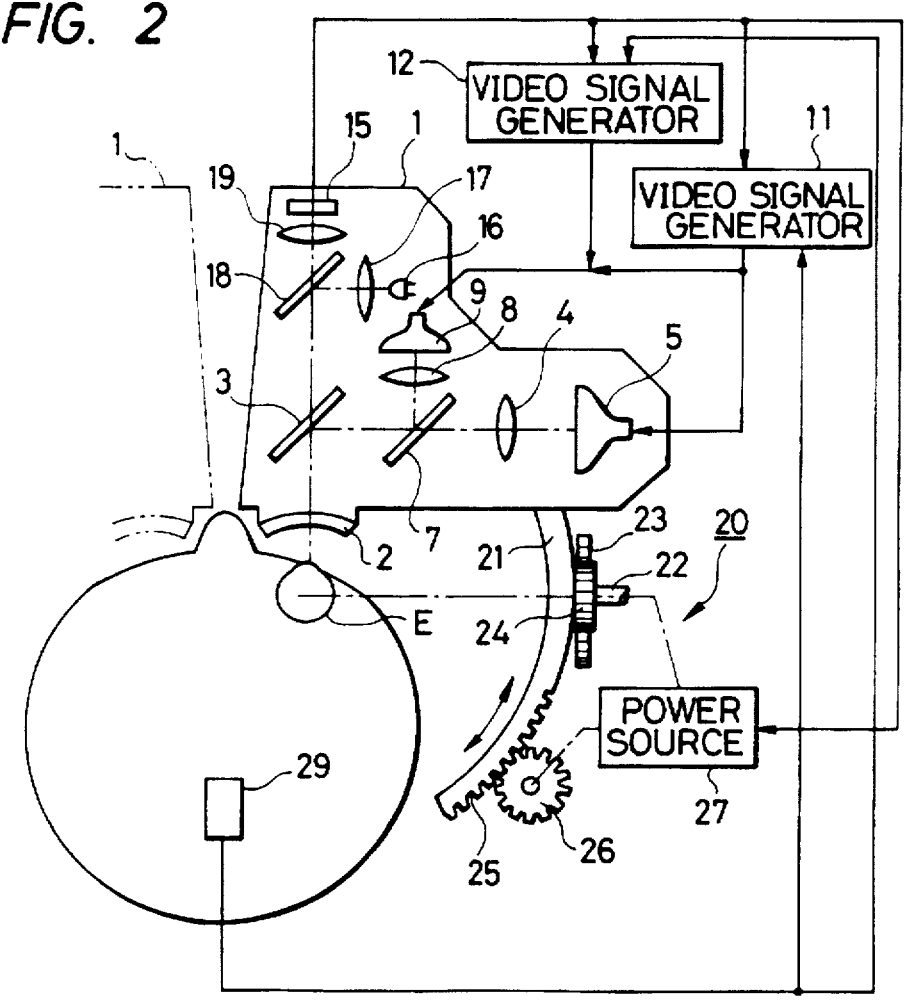
FIG. 2 is a schematic view showing the structure of an essential part of the wide view angle display apparatus.

FIGS. 1 and 2 show an embodiment of the wide view angle display apparatus according to the present invention.

As shown schematically in FIG. 1, the wide view angle display apparatus has a pair of display devices 1, one for each of the user's eyes, movably mounted on the main body (not shown) of the apparatus. The wide view angle display apparatus is not constituted as a helmet equipped with the display devices 1 but as a stationary or semi-stationary unit. The wide view angle display apparatus is designed so that when the head of the user is positioned at the center between the pair of display devices 1, the left and right eyes are located in front of a pair of eyepieces 2 of the display devices.

Figure 3:
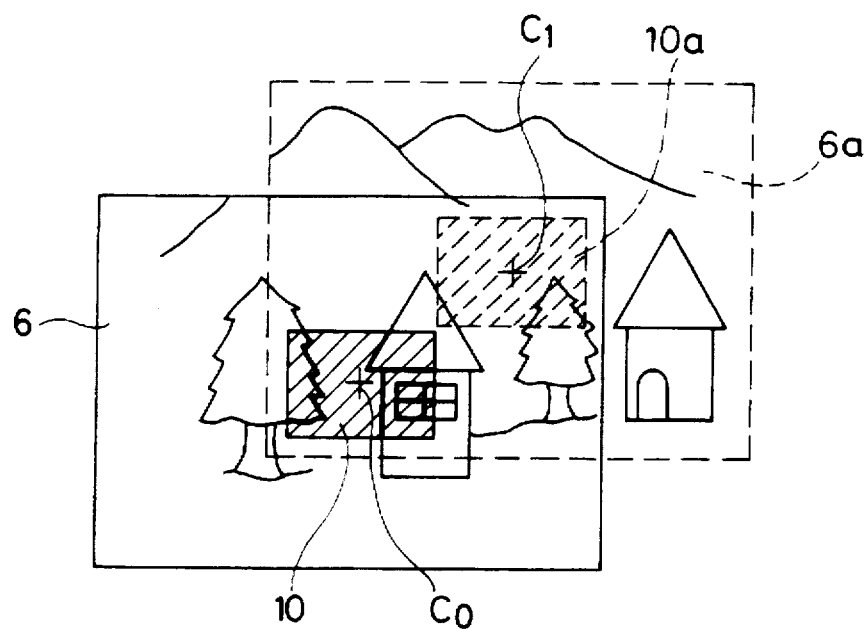
FIG. 3 is diagram for explaining images displayed on the displays of the wide view angle display apparatus.

Since the display devices 1 are similarly constituted, only the configuration of the display device 1 for the right eye is shown in FIG. 2. As shown, the display device 1 includes an eyepiece 2 located immediately in front of the user's eye E, a visible light reflecting mirror 3, a lens 4 and a display 5 for displaying an image. The eyepiece 2, visible light reflecting mirror 3 and lens 4 are arranged so as to form an image of the picture displayed on the display 5 in front of the user's eye. FIG. 3 shows an example of the image 6 displayed on the display 5. (The visible light reflecting mirror 3 reflects all visible light but transmits infrared light.

The display device 1 is further equipped with a high resolution display 9 for displaying a high resolution image 10 which, as shown in FIG. 3, is centered on the view point, and with a half mirror 7 and a lens 8 which superimpose the high resolution image on the center portion of the displayed image 6. The resolution of the human eye is high only at the central region of the field of vision surrounding the view point. Thus the high resolution image 10 produced by the high resolution display 9 and visible to the user only at the central portion of the field of vision gives the user the impression of viewing an image with high resolution throughout, while still enabling the display device 1 to maintain a wide view angle.

The display device 1 is further provided with an eye movement sensor 15 for detecting the user's view point. For detecting the view point, infrared light from an LED 16 is passed through a condenser lens 17 and reflected onto the user's eye E by an infrared half mirror 18. The infrared light reflected by the eye E passes through the visible light reflecting mirror 3, the half mirror 18 and a lens 19 to be received by the eye movement sensor 15. As the eye movement sensor 15 there can be used a CCD camera or a four-sector photodiode array. In the case of the photodiode array, the light to be detected is focused at the center region where the four photodiodes meet and eye movement (direction) is detected from the difference in output among the photodiodes.

Each display device 1 is further equipped with a drive mechanisms 20 which is controlled based on the output from the eye movement sensor 15 for maintaining the centers of the images displayed by the display device 1 aligned with the user's view point. The drive mechanism 20 moves the display device 1 movably supported on the main body of the apparatus both vertically and laterally with respect to the user's eye E. It comprises an arcuate drive member 21 fixed to one side of the display device 1 and a sector gear 23 fixed to the central portion of the drive member 21. The drive member 21 is supported by a shaft 22 of the sector gear 23 so as to be capable of swinging vertically. The sector gear 23 is engaged with a drive gear 24 on the main body side so that the drive member 21 swings vertically with rotation of the drive gear 24. The end of the drive member 21 opposite from that fixed to the display device 1 is formed with a rack 25 which is engaged with a pinion 26 provided on the main body side. The pinion 26 is driven by a power source 27 for moving the drive member 21 along an arc centered on the user's eye.

Although not shown in the drawings, one or the other of the drive gear 24 and the pinion 26 is disposed on a member driven by another drive gear.

The display 5 is connected with a video signal generator 11 which is controlled based on the output from the eye movement sensor 15 for supplying the display 5 with a video signal for displaying the image 6 (FIG. 3) matched to the detected view point. The high resolution display 9 is connected with a high resolution image video signal generator 12 which is also controlled based on the output from the eye movement sensor 15 for supplying the high resolution display 9 with a video signal for displaying a high resolution image 10 at the center portion near the view point.

When the user positions his or her head between the drive members 21 on the front side of the display devices 1 to view a virtual reality image or an image for remote robot control (i.e. a composite binocular image perceived from the two sets of superimposed images 6 and 10) produced in front of the user's eyes by the displays 5 and 9, the drive mechanisms 20 operate in response to the output of the eye movement sensors 15 for moving the display devices 1 so as maintain the centers of the displays 5, 9 aligned with the view points detected by the eye movement sensor 15. In addition, the video signal generators 11, 12 are controlled based on the output from the eye movement sensors 15 for sending to the displays 5 and 9 video signals for producing images matched to the view points. Since the edges of the composite images therefore do not come into the field of vision even when the eyes E are moved, the view angle is enlarged and realism of the displayed binocular image is dramatically enhanced. In FIG. 3, the displayed image 6a and the high resolution image 10a are the images seen by the user when the view point is shifted from point $C_0$ to point $C_1$.

Figure 4:
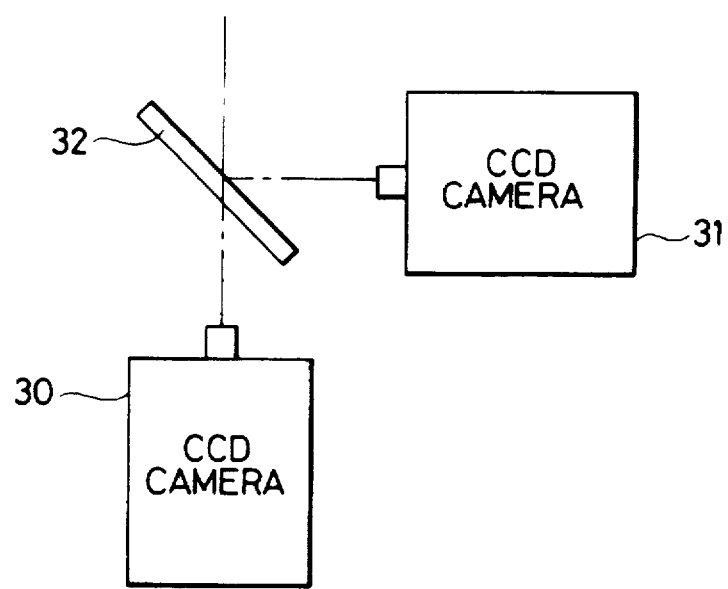
FIG. 4 is a block diagram of an imaging device for obtaining images for display on the displays of the wide view angle display apparatus.

The video signals for producing the displayed image 6 and the high resolution image 10 can be generated by computer graphics or, as shown in FIG. 4, can be generated by using a half mirror 32 to align the imaging axes of a CCD camera 30 for producing the video signal for the image displayed on the display 5 and a CCD camera 31 for producing the video signal for the image displayed on the display 9 so that the images picked up by the two cameras move together with the movement of the user's eye, i.e., so that the imaging is conducted with the cameras being moved vertically and laterally based on the output from the eye movement sensor 15.

Figure 5:
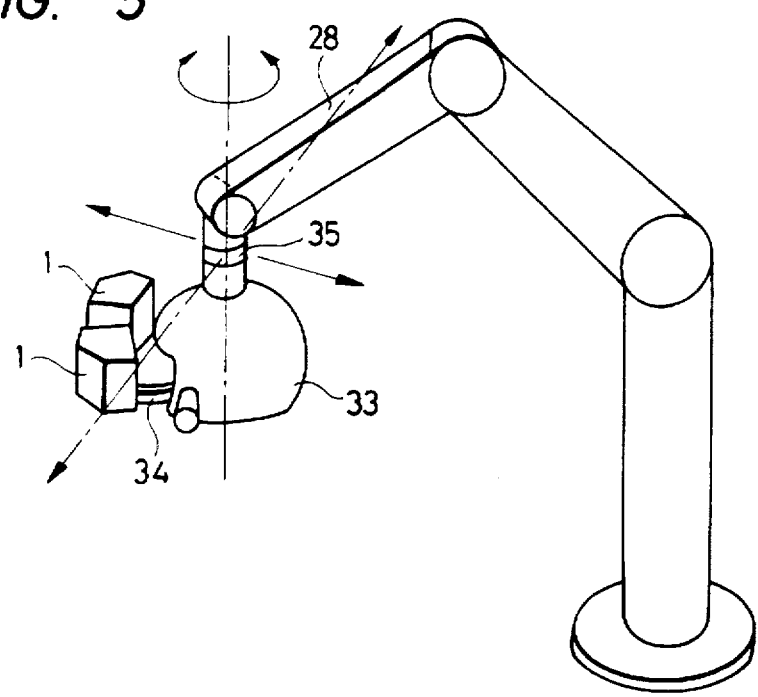
FIG. 5 is perspective view of another embodiment of the wide view angle display apparatus according the invention.

FIG. 5 shows an embodiment in which the main body of the apparatus is constituted as a helmet 33. The pair of display devices 1 are supported on the helmet 33 by links 34 so as to be capable of swinging vertically and rotating, similarly to what was explained regarding the first embodiment. (The mechanisms for swinging and rotating the display devices 1 are not shown in the drawing.) The helmet 33 is suspended from a manipulator 28 via a force sensor 35.

Thus, while the user is wearing the helmet, the display devices 1 are constantly maintained in front of the user's eyes, any shift in the user's view points is detected by the eye movement sensors of the display devices 1, and, based on the outputs from the eye movement sensors, the display devices 1 are moved to keep the centers of the displays aligned with the view points. In addition, any movement of the user's head is detected by the force sensor 35 and images are presented on the displays 5 and 9 in correspondence to the changing position of the head.

Figure 6:
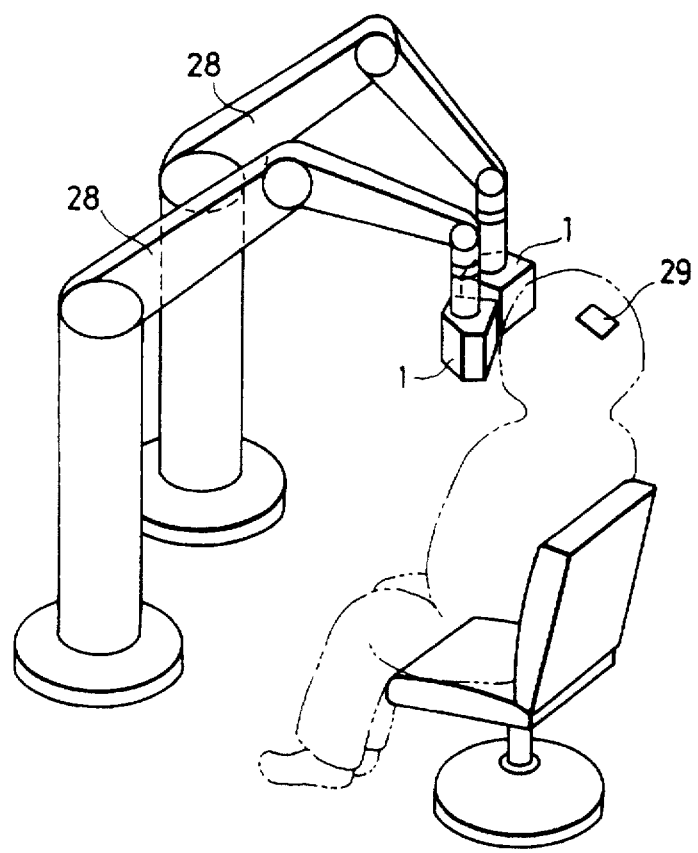
FIG. 6 is a perspective view of still another embodiment of the wide view angle display apparatus according to the invention.

While this embodiment uses link mechanisms for supporting and moving the display devices, it is instead possible, as shown in the embodiment of FIG. 6, to use a pair of manipulators as the support/movement mechanism. In this case, two manipulators 28 are provided and one of the two display devices 1 is attached to each. The manipulators are controlled based on the outputs from the eye movement sensors so as to maintain the display devices 1 with the displays centered on the view points.

The wide view angle display apparatus can be further provided with a detector 29 for detecting movement of the user's head. The detector 29, which is attached directly or indirectly to the user's head, outputs a signal indicating movement of the user's head to the support/movement mechanism of the display devices 1 (the manipulators 28) and the video signal generators 11, 12, whereby the positions of the display devices 1 are controlled in response to the head movement for constantly maintaining them in front of the user's eyes and the video signal generators 11, 12 are controlled for displaying images on the displays 5, 9 whose positions are matched to the head movement. If eye movement and head movement are simultaneously detected, the manipulators 28 move the display devices 1 so that the view points are positioned at the centers of the displays 5, 9.

When the wide view angle display apparatus described in the foregoing is used to present images which give the viewer a sense of virtual reality or images for remote robot control, the displays are moved in response to shifts in the user's view points so that the images presented on the displays are changed accordingly. Since the user's view points are therefore constantly maintained at the centers of the displays, the user does not see the edges of the displays. As a result, the user perceives a wide view angle and is able to view a wide angle image with enhanced reality.

Moreover, owing to the fact that the resolution of the human eye is high only at the central region of the field of vision surrounding the view point, the user of the wide view angle display apparatus is given the impression of seeing an image of very high resolution throughout notwithstanding that the image resolution is increased only at only at the central portion of a wide field of vision.

In addition, since the display devices are moved in response to head movement, the user is able to view the image in any desired direction.

Obviously, numerous modifications and variations of the present invention are possible in light of the above teachings. It is therefore to be understood that within the scope of the appended claims, the invention may be practiced otherwise than as specifically described herein.

What is claimed is:

1. A wide view angle display apparatus comprising a pair of display devices each including a display for displaying an image, a high resolution display for superimposing a high resolution image at a center portion of the displayed image and eye movement detection means for ascertaining a view point, a support/drive means associated with each display device for supporting the display device and moving the display device in accordance with a signal from the eye movement detection means to keep a center of the displayed image coincident with the view point, a video signal generating means associated with each display device for sending a view point video signal to the display based on a signal from the eye movement detection means, and a high resolution video signal generating means associated with each display device for sending a high resolution video signal to the high resolution display.

2. A wide view angle display apparatus according to claim 1, further comprising a detector for producing a signal indicating head movement in response to which the displays are moved in coordination with head movement and images are displayed on the displays in accordance with the instantaneous head position.

3. A wide view angle display apparatus according to claim 1, wherein the eye movement detection means comprises an infrared LED which emits infrared light onto the eye whose movement is being detected and a sensor for receiving infrared light emitted by the LED and reflected by the eye.

4. A wide view angle display apparatus according to claim 1, wherein the support/drive means is at least one manipulator.

* * * * *

UNITED STATES PATENT AND TRADEMARK OFFICE
CERTIFICATE OF CORRECTION

PATENT NO. : 5,751,259
DATED      : May 12, 1998
INVENTOR(S): Kazuyo IWAMOTO, et al.

It is certified that error appears in the above-identified patent and that said Letters Patent is hereby corrected as shown below:

On the title page, Item [*], the Terminal Disclaimer information has been omitted. It should read:

-- The term of this Patent shall not extend beyond the expiration date of Pat. No. 5,635,947.--

On the title page, in Item [73], the assignee's address has been omitted. It should read:

--Tokyo, Japan--

Signed and Sealed this

Twenty-seventh Day of October, 1998

Attest:

BRUCE LEHMAN

Attesting Officer

Commissioner of Patents and Trademarks